United States Patent [19]

Sproul, Sr.

[11] E Re. 28,852

[45] Reissued June 8, 1976

[54] TRAFFIC SIGNAL WITH DIRECTIONAL INDICATOR

[76] Inventor: Fred C. Sproul, Sr., 12227 Ranch House Road, San Diego, Calif. 92128

[22] Filed: Aug. 23, 1974

[21] Appl. No.: 500,144

Related U.S. Patent Documents

Reissue of:

[64] Patent No.: 3,740,716
Issued: June 19, 1973
Appl. No.: 198,332
Filed: Nov. 12, 1971

[52] U.S. Cl. ..... 340/107; 340/108; 340/110

[51] Int. Cl.[2] ..... B60Q 1/00

[58] Field of Search ..... 340/31, 42, 107, 108, 340/109, 110, 111, 112

[56] References Cited

UNITED STATES PATENTS

| | | | |
|---|---|---|---|
| 2,205,169 | 6/1940 | Hallman | 340/118 R |
| 3,200,218 | 8/1965 | Wagner | 340/110 R X |
| 3,210,728 | 10/1965 | Davis | 340/42 X |

*Primary Examiner*—Harold I. Pitts
*Attorney, Agent, or Firm*—Knobbe, Martens

[57] ABSTRACT

Substantially translucent lenses to be used in combination with standard traffic control signals. Information relating to the direction of vehicles are provided in such a manner on the lenses that motorists are constrained to view the information.

4 Claims, 3 Drawing Figures

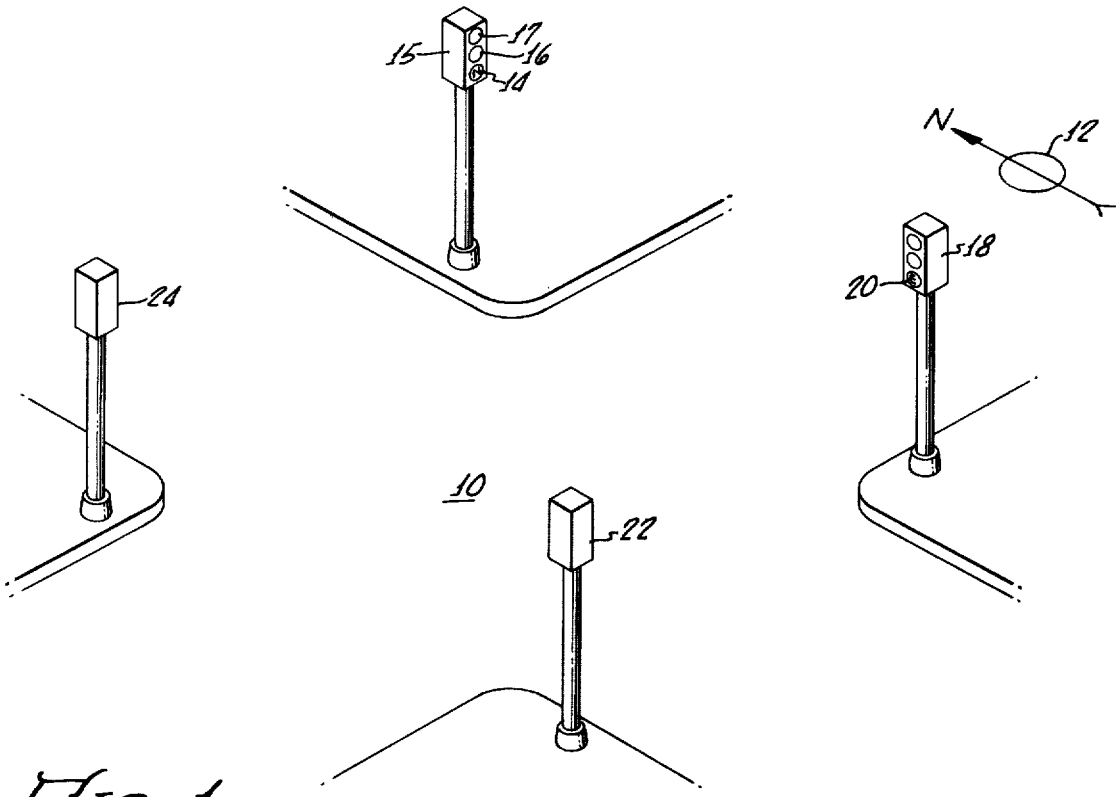
FIG. 1.
FIG. 2.
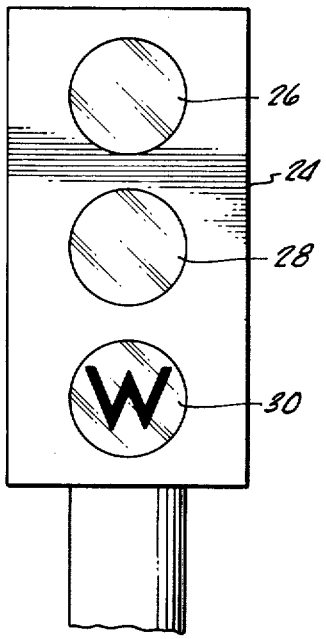
FIG. 3.
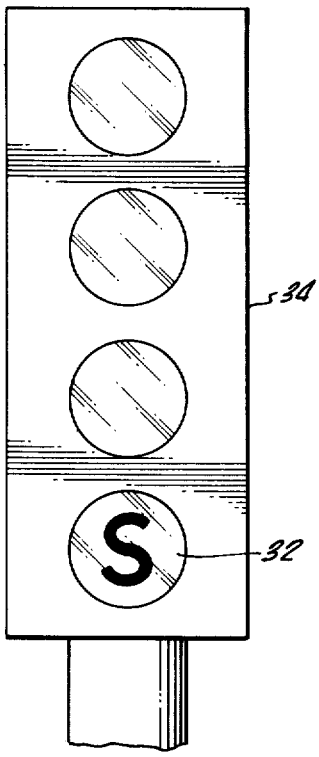

TRAFFIC SIGNAL WITH DIRECTIONAL INDICATOR

Matter enclosed in heavy brackets [ ] appears in the original patent but forms no part of this reissue specification; matter printed in italics indicates the additions made by reissue.

BACKGROUND OF THE INVENTION

It is generally the practice throughout the United States to provide many types of information to motorists by way of lettered signs along the sides of roadways. In certain instances, at least, the placing of such signs may be inefficient, unsafe, and uneconomical.

Consider a motorist desirous of orienting himself to the compass bearing of the street along which he is driving. Under the present system, if such information is given at all, it usually is only on street signs which tell the motorist whether the street numbers are, for example, North or South. In the few cases where directional information is given directly, the signs are far apart and not conveniently located. In any event, the motorist must continually take his eyes from the traffic and traffic flow control devices and signals to search out such signs to give him the requisite information as to which direction he is traveling. The search can be both time-consuming and frustrating as well as unsafe (to the extent that one's attention is diverted for a significant portion of the driving time.) Too, the chance of not perceiving a sign that one passes is good, because of the tremendous number of signs and other visual inputs that assault the mind while driving. Traditional direction signs, of course, add to the volume of distractions and unsightly objects along roadways. Any means of reducing their number without foregoing their usefulness would be beneficial.

Road signs are also expensive for any municipality to provide. This is undoubtedly one reason for so few on the roadways that offer information relative to vehicle compass headings. The dearth of direction signs adds to the general confusion of being lost since one never knows where the next such sign might be. For the motorist in need of orientation, the lack of sufficient numbers of direction signs supplied in a systematic manner makes the task of finding one oftentimes difficult.

Another problem of particular interest relative to the present invention is that of the motorist who is merely confused or who does not realize he is indeed lost. Such a person would normally not be looking for directional information, and therefore he might fail to see any sign which is located in the traditional manner. The freeway age in which we live makes this a significant problem in itself. People are constantly exiting from freeways by circuitous ramps, thus arriving at often unfamiliar surroundings, after having had their bearings confused. Often they are not even aware that their sense of direction has been adversely affected.

SUMMARY OF THE INVENTION

The present invention alleviates in great measure the difficulties set forth above. In the peferred embodiment, one of the three colored lenses of a standard traffic signal is provided with vehicle heading information, preferably in the form of an abbreviation denoting the direction of travel. Thus a motorist travelling north on a north-south street would see in one of the lenses of each of the traffic signals he passes a large block letter "N." Similarly, depending upon the direction of travel he might also see in the respective lenses the letters "S," "E," "W," "NW," "SE," and so on. An alternative embodiment is also contemplated wherein traffic signals would be provided with a forth light on which the vehicle heading information would appear.

The novel arrangement herein set forth exhibits a number of significant advantages over the traditional means of supplying motorists with directional information. Among these advantages is the important fact that every driver must look at the traffic signals he encounters. According to the present invention, useful direction information is provided in a location such that merely driving a vehicle past a signal ensures that people will see it. The driver not only "forced" to view the vehicle heading information displayed thereon, but the viewing thereof does not necessitate taking ones eyes from the road any more than is normally required to view the traffic signals. One need not cast one's eyes about the sides of the roadway while driving along.

Another advantage, related in part to the safety considerations, is the utility of the contemplated systematic depolyment of the novel lenses of the present invention in every signal in a municipality of jurisdiction. In such an arrangement, motorists in any given area would known that the vehicle heading information was displayed in all the signals, and therefore they would not, when lost, have to search the road sides, as discussed above. Further, the lenses of the preferred embodiment could easily be placed in traffic signals in such a systematic manner because of the low cost involved, especially as compared with the cost of traditional road signs. For example, the operation could be accomplished simply by exchanging all the old green lenses for the lettered lenses of the present invention. Also, installation of the devices in the present invention would mean that removal and disposal of the unsightly road signs thus displaced could also be accomplished.

Finally, it would be pointed out that the present invention provides an efficient means for apprising people who have unknowingly lost their bearings of their true situation. Rather than making them dependent on a chance sighting of a traditional road sign, the needed information is readily apparent immediately upon encountering a traffic signal.

BRIEF DESCRIPTION OF THE DRAWINGS

These, and other advantages of the present invention, may be more clearly understood and appreciated by reference to the attached drawings, in which:

FIG. 1 is a perspective view of an intersection, each corner of which is provided with a traffic signal utilizing the preferred embodiment of the present invention;

FIG. 2 is an elevational view of a traffic signal incorporating the preferred embodiment of the present invention; and FIG. 3 is an elevational view of an alternate embodiment of the present invention.

Referring first to FIG. 1, there is depicted an intersection 10 having at each of the four corners traffic signals of the well known and commonly-used variety provided with the preferred embodiment of the present invention. (The arrow 12 indicates the compass direction "North"). Except for the inclusion of the lens 14 with the vehicle heading information, which in the exemplary embodiment has the form of an abbreviation "N" disposed thereon, the traffic signal 15 is in all respects a standard model such as is generally used. As shown in FIG. 1, the lens 14 is the green lens. An amber lens 16 and a red lens 17 are also depicted. Conventional means for selectively illuminating each of the lenses from behind are provided within the traffic signal 15.

A traffic signal 18 is also shown, which signal is identical with the traffic signal 15 with the exception of the provision of a green lens 20 having the letter "E" disposed thereon. The other two traffic signals shown 22 and 24, have the letters "S" and "W" disposed on their respective green lenses (not shown). Although both the "N" on the lens 14 and the "E" on the lens 20 are visible simultaneously in the drawing, this is solely to show clearly the function of the present invention. In actual use, at any instant of time, the only two letters being visible simultaneously would be the "N" and "S," when their respective illuminating means are on and those of the "E" and the "W" are off; or the "E" and "W" when their respective illuminating means are on and those of the "N" and "S" are off.

Having reference now to FIG. 2, there is shown individually the traffic signal 24. Indicated by reference numerals 26, 28 and 30 respectively are a red lens, an amber lens, and a green lens. Vehicle heading information—in this embodiment having the form of a block "W" — is provided on the green lens 30 such that the light transmission characteristics are thereby altered. Although the letter "W" as shown is opaque, so as to block entirely a portion of the light beam emanating from the illumination means (not shown) within the traffic signal 24 itself, it is also contemplated that the letter could be reproduced on the lens in, for example, outline form, such that merely the outline of the letter is actually opaque. As another alternative the background of the lens could be opaque with only the letter translucent, although such is not preferred as it reduces visibility of the traffic signal. Furthermore, it is possible also to provide the vehicle heading information on another of the standard three lenses. The information may be applied to the lens by any technique known in the art, through the methods of etching or stencilling are thought to be particularly apt.

As shown in FIG. 3, an alternative embodiment is contemplated wherein a traffic signal 32 is provided with four lenses: a red lens 34, an amber lens 36, a green lens 38, and a forth lens 40, which may be of any appropriate color. The lens 40 would be illuminated continuously, thus offering the advantage of constant visibility of the vehicle heading information. In this embodiment of the present invention, the vehicle heading information takes the form of an abbreviation for a compass direction and is shown as the letter "S" on the lens 40.

In operation, a motorist travelling north toward the intersection 10 of FIG. 1 would see, when he had the green light, the letter "N" on the (green) lens 14. Due to the lens shades normally placed over the traffic signal lenses, the driver heading north would not usually be able to see the traffic signals for drivers travelling in the other directions, thus no confusion would result.

What is claimed is:

1. Apparatus for displaying adjacent a roadway orientational information indicative of the compass heading direction in which a vehicle must be traveling if the vehicle operator can view the apparatus, in such a manner that motorists on said roadway must of necessity observe it, comprising:

a traffic signal comprised of at least three different-colored lenses and means of illuminating said lenses [ selectively ], said traffic signal installed with said lenses directed toward a first compass heading; and means for permanently modifying the light beam transmitted by one of said lenses to convey information indicative of a second compass heading opposite said first compass heading to provide information as to the direction in which vehicles approaching the traffic signal are traveling.

2. The apparatus as described in claim 1 in which said means for modifying the light beam transmitted by said one of said lenses of traffic signal comprises the provision on said one of said lenses of an abbreviation for the compass heading direction in which vehicles subject to the instructions of said traffic signal are traveling.

3. A traffic signal comprising, in combination:

a plurality of different-colored lenses adapted to be illuminated from behind and facing so as to be clearly directed for visibility by vehicle traffic heading in only one compass direction;

means for [ selectively ] illuminating each of said lenses; and vehicle heading information provided on one of said lenses such that the light transmission characteristics of said one of said lenses are altered thereby, said vehicle heading information comprising an abbreviation for said one compass direction.

4. The traffic signal apparatus as set forth in claim 3 in which said vehicle heading information is provided on the green lens of said traffic signal.

* * * * *

UNITED STATES PATENT OFFICE

CERTIFICATE OF CORRECTION

Patent No. Re. 28,852 Dated June 8, 1976

Inventor(s) Fred C. Sproul, Sr.

It is certified that error appears in the above-identified patent and that said Letters Patent are hereby corrected as shown below:

Column 1, line 63, "peferred" should read -- preferred --.

Column 2, line 6, "forth" should read -- fourth --.

Column 2, line 16, after "driver", insert -- is --.

Column 2, line 24, "depolyment" should read -- deployment --.

Column 2, line 27, "known" should read -- know --.

Column 3, line 47, "forth" should read -- fourth --.

Column 4, line 32, after "of" insert -- said --.

Signed and Sealed this

Sixteenth Day of November 1976

[SEAL]

*Attest:*

RUTH C. MASON
*Attesting Officer*

C. MARSHALL DANN
*Commissioner of Patents and Trademarks*